UNITED STATES PATENT OFFICE.

EMIL JACOBSEN, OF BERLIN, GERMANY.

PRODUCTION OF YELLOW COLORING-MATTER.

SPECIFICATION forming part of Letters Patent No. 290,585, dated December 18, 1883.

Application filed April 9, 1883. (Specimens.) Patented in Germany November 4, 1882, No. 23,967; in England March 14, 1883, No. 1,362, and in France March 27, 1883, No. 154,512.

*To all whom it may concern:*

Be it known that I, EMIL JACOBSEN, of Berlin, Kingdom of Prussia, Germany, have invented a new Improvement in the Manufacture of a Coloring-Matter or Yellow Dye-Stuff from Chinaldine or a Homologue thereof; and I do hereby declare the same to be described as follows:

Chinaldine, which is present in the crude chinoline of coal-tar, and which can also be obtained synthetically by different processes, forms, when heated with phthalic anhydride and chloride of zinc, a yellow coloring-matter soluble in spirit, but insoluble in water. This matter dyes wool or cotton yellow, and may be produced by the following process: Take ten parts of chinaldine, twelve parts of phthalic anhydride, and one part of chloride of zinc, and heat the same to a temperature from 190° to 210° of the centigrade thermometer, or thereabout, and boil out the resulting melt with diluted muriatic acid. The substance or yellow coloring-matter thus obtained is soluble only in spirit. To render it soluble in water, it should be heated with a suitable amount of sulphuric acid, (as, for instance, three or four parts of the acid to one of the substance,) monochlorhydrine, or the equivalent quantity of fuming sulphuric acid, until a sample of it will dissolve in water, after which the remainder is to be poured into water containing milk of lime, and, after having been separated from the sulphate of lime by means of filtration, is to be evaporated to dryness. The substance thus obtained is the coloring-matter soluble in water. With carbonate of soda it can be converted into a soda salt, which can be used for dyeing purposes.

I claim as a new manufacture—

The yellow coloring-matter, substantially as described, derived from chinaldine, (or a homologue thereof,) phthalic anhydride, and chloride of zinc, treated essentially as set forth, to obtain a product soluble in spirit, in water, and for use as explained.

EMIL JACOBSEN.

Witnesses:
  B. ROI,
  G. H. SMITH.